US006680394B1

(12) United States Patent
Brumm et al.

(10) Patent No.: US 6,680,394 B1
(45) Date of Patent: Jan. 20, 2004

(54) METHOD FOR PRODUCING THREE-DIMENSIONAL CROSS-LINKED OXIDIZED UNSATURATED FATTY ACIDS AND/OR FATTY ACID ESTERS

(75) Inventors: Karen Brumm, Bremen (DE); Thomas Lage, Stuhr (DE); Hanns-Jörg Mauk, Mundelsheim (DE); Bernd Schulte, Delmenhorst (DE); Karl-Heinz Schwonke, Delmenhorst (DE)

(73) Assignee: DLW Aktiengesellschaft, Bietigheim-Bissingen (DE)

( * ) Notice: Subject to any disclaimer, the term of this patent is extended or adjusted under 35 U.S.C. 154(b) by 0 days.

(21) Appl. No.: 09/913,804
(22) PCT Filed: Feb. 18, 2000
(86) PCT No.: PCT/EP00/01366
§ 371 (c)(1),
(2), (4) Date: Nov. 15, 2001
(87) PCT Pub. No.: WO00/49101
PCT Pub. Date: Aug. 24, 2000

(30) Foreign Application Priority Data

Feb. 18, 1999 (DE) .......................... 199 06 832

(51) Int. Cl.$^7$ ................................. C09F 7/00
(52) U.S. Cl. ..................... 554/27; 554/24; 554/25; 554/26
(58) Field of Search .................. 554/24, 25, 26, 554/27

(56) References Cited

U.S. PATENT DOCUMENTS

| 5,179,149 | A | | 1/1993 | Höver et al. ............... 524/310 |
|---|---|---|---|---|
| 5,542,935 | A | * | 8/1996 | Unger et al. |
| 5,580,575 | A | * | 12/1996 | Unger et al. |
| 5,715,824 | A | * | 2/1998 | Unger et al. |
| 5,770,222 | A | * | 6/1998 | Unger et al. |
| 5,935,553 | A | * | 8/1999 | Unger et al. |

FOREIGN PATENT DOCUMENTS

| DE | 565786 | 11/1932 |
|---|---|---|
| DE | 58318 | 6/1980 |
| GB | 18825 | 8/1912 |
| RU | 426965 | 12/1972 |
| RU | 810748 | 7/1981 |

OTHER PUBLICATIONS

Chemical Abstracts, vol. 81, No. 14, Oct. 10, 1974, Columbus, Ohio, US; Abstract No. 79367s, S.F. Khokhlov et al.: "Oxidation of vegetable oil under foam conditions. I"; p. 107, col. 1; XP002139768 & VOP. KHIL. KHIM. TEKHNOL., vol. 30, 1973, pp. 31–36.

Database WPI Section Ch, Week 198150, Derwent Publications Ltd., London, GB; AN1981–92447D XP 002139769 & SU–A—810748 (DNEPR CHEM TECH), Mar. 7, 1981.

Database WPI Section Ch. Week 197528, Derwent Publications Ltd., London, GB; AN1975–47269W XP 002139770 & SU–A–426965 (NOVCH ELECTRODE WKS), Dec. 12, 1974.

* cited by examiner

*Primary Examiner*—Paul J. Killos
(74) *Attorney, Agent, or Firm*—Womble Carlyle Sandridge & Rice, PLLC

(57) ABSTRACT

The invention relates to a continuous method for producing a cross-linked unsaturated fatty acid-based or fatty acid ester-based bonding agent, an elastic bonding agent produced according to said method and the use of said elastic bonding agent.

26 Claims, 1 Drawing Sheet

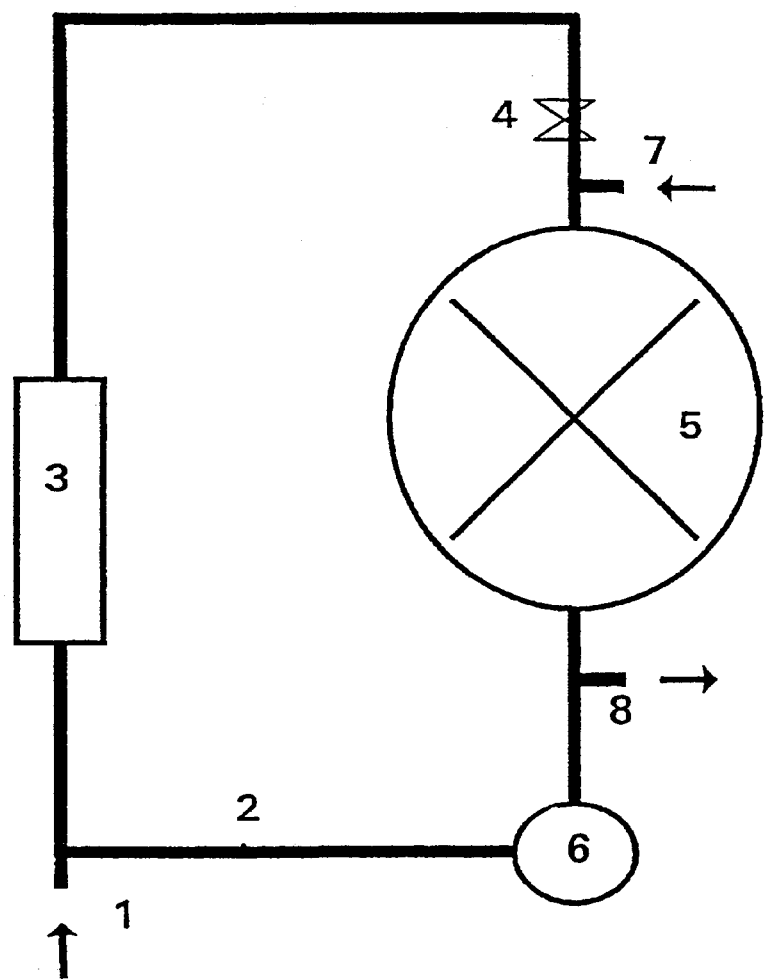
Figur 1

METHOD FOR PRODUCING THREE-DIMENSIONAL CROSS-LINKED OXIDIZED UNSATURATED FATTY ACIDS AND/OR FATTY ACID ESTERS

This Application is a 371 of PCT EP00/01366 filed Feb. 18, 2000.

The invention relates to a continuous process for the production of cross-linked binding agent on the basis of unsaturated fatty acids and/or fatty acid esters, an elastic binding agent that can be produced by the process and the use of the elastic binding agent.

Binding agents made of natural oils today require relatively expensive preparation. For the production of the linoleum binding agent, today the following essentially distinct processes are known:

Bedford process (process presently used by all linoleum producers)

Taylor process (black oil)

Nettle process (hanging nettle paths are perfused with linseed oil)

Dripping process

Dünneberg process (emulsion process)

Using these processes, the initial material for the binding agent—in the case of the production of linoleum natural oils, which contain various unsaturated fatty acids and/or fatty acid esters, are oxidized and cross-linked. The oxygen needed for the oxidation must be used in excess in all cases, so that only one part of the oxygen applied is used at any given for the reaction and ever-increasing quantities of air must be passed through the process, and thus large quantities of exhaust gas result. While the emissions are always decomposition products of vegetable fats, in other words, emissions of natural origin, they are still perceived as noxious smells. Therefore, nowadays, costly disposal units are required for the purification of the exhaust air, for example after-burn units.

Furthermore all the processes known in prior art are thoroughly inadequate, in that they also run only discontinuously ("batch processes") and require a long processing time for each charge. In addition to this, large units or several small units must always be acquired for these processes, in order to achieve low production costs for the binding agents.

The generally used Bedford process furthermore involves an unfavorable duration for each charge of up to 20 hours approximately, so that regardless of the number of orders a producing firm has, at least a three-shift operation is required.

Thus the object of the present invention is to provide a production process for binding agents, which should exhibit shorter processing times and a better use of oxygen, and also less exhaust air.

This object is attained by the embodiments designated in the claims.

In particular, a process for the production of a cross-linked binding agent on the basis of unsaturated fatty acids and/or fatty acid esters would be made available, which includes at least one foaming of a mixture containing unsaturated fatty acids and/or fatty acid esters with oxygen or with a gaseous mixture containing oxygen, and the reacting of the unsaturated fatty acids and/or fatty acid esters contained in the mixture through oxidation and cross-linking, in order to obtain the cross-linked binding agent.

The unsaturated fatty acids and/or fatty acid esters contained in the mixture to be reacted mainly originate from natural oils, particularly linseed oil. The reaction mixture containing unsaturated fatty acids and fatty acid esters is therefore also called "oil" from now on. The concept of a gaseous mixture containing oxygen may also include pure oxygen.

Through the foaming of the gaseous mixture, the boundary surface or the contact surface between the oil and the oxygen is significantly increased. Because of this, a faster and more uniform interaction of the oxygen in the air with the surface of the oil takes place, so that more oxygen molecules per unit of time come into contact with unsaturated compounds of the unsaturated fatty acids and/or fatty acid esters.

The formation of foam, or the foaming, or the mechanical dispersion with the gaseous mixture containing oxygen in the mixture containing the unsaturated fatty acids and/or fatty acid esters can be carried out in three different ways:

1. The mixture is channeled through a system of steel pipes; the system integrates one or more static mixers one after another; these mixers create a finely dispersed and stable foam by feeding in a mixture of a gaseous mixture containing oxygen.
2. In place of the static mixers, dynamic mixers (rotor-stator principle), such as whipped foam mixers, can be used.
3. The vegetable oil can also be whipped in batches in a stirrer boiling vessel with dissolver and mixer disk, in such a way that a foam with fine cells results, which is fed into the overall continuous process.

As static mixers, the types SMV, SMF, SMXL, SMR and SMX of the Sulzer firm, or the Primixer type of the Striko firm, or the Primixer Quarto of the firm Fluitec CSE mixer are preferred. Especially preferred is the SMX type mixer of the Sulzer firm. As dynamic mixers, the types Eco Mix, Food Mix, Top Mix, Uni Mix or Compact Mix of the Hansa company are preferred for use, while the Top Mix or Uni Mix types of the Hansa firm are especially preferred. In static mixers, rotation speed of 2 to 100 l/min is preferred, preferably from 5 to 50 l/min.

The reaction speed of the oxidation and cross-linking of the unsaturated compounds in the mixture depends on the temperature of the mixture, or on the addition of reaction accelerators, or even on the quality of the foam. The quality of the foam includes both the fineness of the foam cells and the stability of the foam. The smaller the foam cells are, the greater the contract surface is between the gaseous mixture containing oxygen and the oil, and therefore the faster the oxidation of the unsaturated fatty acids and/or fatty acid esters takes place, and the faster the oxygen will be used up, and the more uniformly the mixture containing the fatty acids or the fatty acid esters will be oxidized and cross-linked. Thus, for a shorter reaction time, a fine-celled foam is preferred. Especially preferred is a foam weighing between 80 and 800 g per liter, and even more preferably between 150 and 500 g. To influence the structure of the foam and the stability of the foam, agents that increase surface interaction, such as lecithin or acetylated lecithin can be added to the mixture.

According to one embodiment of the process according to the invention, the viscosity of the mixture at the beginning of a reaction is generally still in the low range, for example between 50 and 80 mPas, so that the resulting foam is not yet very stable and will disintegrate if the pressure falls. However, this has the advantage that, because of the disintegration of the foam, a more effective exchange between the used air, i.e., air without oxygen or with a low oxygen content and new, unused air is attained. In terms of the technology of the process, it is thus preferable to run in so-called gassing cycles, in which the mixture is first intensively foamed with a gaseous mixture containing oxygen under a given pressure and then, after the reaction has taken place, it is again unfoamed through a drop in pressure, so that a new gassing cycle can be started up, in which the oil is preferably run in a circular process in a system made of steel pipe. In such a foaming process under pressure, the preliminary pressure of the oil can be set at 0.1 to 15 Mpa, more preferably between 0.1 and 5 Mpa, and most preferably between 0.2 to 2.0 Mpa, and the preliminary pressure of the gaseous mixture containing oxygen can be set between 0.15 and 5.5 Mpa, more preferably between 0.25 and 2.5 Mpa.

Furthermore there is preference for 1 to 1,000 cycles, with particular preference for 50 to 500 cycles for the foaming and reacting of the oil. As a result the treatment times for the cyclical foaming and reacting range from 5 min. to 8 hours, while the reaction at this stage of the process is preferably completed after 1 to 6 hours.

In another embodiment of the process according to the invention, the mixture defined above can be first foamed and then, using compression, be placed under pressure.

The speed of the reaction is also affected by the temperature of the reaction mixture. The temperature of the reaction during the reaction should preferably be between 10 and 150° C., more preferably between 50 and 120° C. Since the reaction is exothermic, the foam must be cooled as needed to control the reaction.

As the gaseous mixture containing oxygen, air is preferably used. The consumption of air is preferably 5 to 100% by weight, with particular preference for 15 to 50% weight, in relation to the oil. However, pure oxygen may be used for the foaming. This further accelerates the cross-linking process and a low exchange rate between the gas and the foam is necessary. In this case, care must be taken, on account of the greater speed of the reaction, so the system cooling will be intensified as needed, while the cross-linking process can be carried out at even lower temperatures. This embodiment, besides the shortened reaction time, also exhibits the advantage that very little exhaust air results.

FIG. 1 shows a diagrammatic representation of a unit to carry out the process according to the invention according to a preferred embodiment. The oil is fed through intake 7 into pipe system 2 and, by means of pump 6, is fed to the static or dynamic mixer 3. The gaseous mixture containing oxygen or the reaction gas is fed in through supply valve 1 into the pipe system 2.

In the static or dynamic mixer 3, the mixture is foamed with the reaction gas and fed through the pipe system by way of a pressure maintenance valve 4 into reaction boiler vessel 5, which is equipped with a stirring device. By means of pump 6, the partially reacted mixture is again fed into mixer 3, so that a new cycle can begin. After the desire degree of reaction is attained, the reacted oil is removed from the unit through outlet 8.

According to another embodiment of the present invention, a final boiling phase or continuous boiling phase of the already considerably thickened reaction mixture or reacted oil may be added to this process. This final boiling phase may be carried out discontinuously (1) as a phase to calm down the reaction in a reaction vessel with a stirring device and is preferably continued for 10 to 180 minutes, especially preferably continued for 20 to 120 minutes at a temperature between 40 and 180° C., more preferably between 60 and 140° C. The final boiling phase may also be carried out even more efficiently (2) with a boiling extruder with a double-lead screw and jolting elements under increased pressure in the extruder system in a continuous manner, in that (a) the gas-oil mixture can be continuously compressed using extruder technology or else (b) the thickened oil free of gas can be cross-linked with the addition of organic peroxides in the double-lead screw extruder. Depending on the rheology required, a residue of the peroxide content may remain in the mass, which is then completely decomposed by raising the temperature, and so the binding agent will be completely cross-linked. Examples of the peroxides that may be used are didecanoylperoxide (DP), dimethylperoxide-dicarbonate (MYPC), t-butylperoxypivalate (DBPPI), t-butylperoxy-2-butylperoxide, 2.5-dimethyl-2.5-di(t-butylperoxy)hexan (DHBP) and di-t-butylperoxide (DTBP). These peroxides are preferably used in a concentration of 0.05 to 1.0 percent by weight, and more preferably between 0.1 and 0.7 percent by weight and at a temperature between 80 and 200° C. According to this embodiment, the final cross-linking may take place in two stages, whereby at first the reaction mixture is heated, preferably with partial cross-linking, to a temperature, at which the peroxide exhibits a degree of stability that is sufficiently long, and then the reaction mixture, which has preferably been previously cross-linked, is compressed in a suitable device at a temperature, at which the half change value of the peroxide is decreased in such a way a complete cross-linking, essentially initiated by the peroxide, takes place.

If need be, the reaction may be stopped by immersing the reaction mixture in water and cooling it.

Before the cross-linking process by means of foaming with a gaseous mixture containing oxygen, according to a further embodiment, a preliminary cross-linking may take place, so that a multiple-stage cross-linking is possible. Thus a combination of cross-linking induced by ultraviolet waves with the help of the ultraviolet activators and subsequent oxidation and cross-linking by means of a gaseous mixture containing oxygen has proven to be extremely effective. In this way the processing times can be reduced even more.

The mixture containing the unsaturated fatty acids and/or fatty acid esters can also be advantageously tempered before the foaming. Preferably this step takes place in a continuous manner. Here the mixture is pre-tempered for 1 to 90 minutes, preferably for 20 to 60 minutes at a temperature between 70 and 300° C., preferably between 100 and 190° C. This tempering, preferably by means of a flow heater, causes the decomposition of any natural or artificial oxidation stabilizers present in the reaction mixture, if need be, such as tocopherol, phosphatides and mucic materials.

The characteristics of the binding agent are additionally influenced by the composition of the mixture containing the unsaturated fatty acids and/or fatty acid esters and, by appropriate selection of the components of the mixture, can be varied in different directions.

The unsaturated fatty acids and/or fatty acid esters are generally used in the form of naturally occurring fatty acids and/or fatty acid esters, particularly vegetable oils. Each vegetable oil (triglyceride ester) has a specific composition of different bonded fatty acid esters, which in turn exhibit a different number and position of double bonds that can be cross-linked. According to the present invention, linseed oil is preferably used. According to its origin, linseed oil exhibits the following composition.

| | | |
|---|---|---|
| Palmitic acid | 4–6.5% by weight | Preferably 5–6% by weight |
| Stearic acid | 2.5–5.0% by weight | Preferably 3–4% by weight |
| Oleic acid | 16–23% by weight | Preferably 18–21% by weight |
| Linoleic acid | 13–18% by weight | Preferably 15–17% by weight |
| Linolenic acid | 48–60% by weight | Preferably 52–58% by weight |
| Iodine number | 175–200 | Preferably 185–195 |
| Acid value | 0.8–4.0 | Preferably 1.5–3.0 |

Also other drying oils and mixtures composed of drying and half dried oils have shown considerable results. In addition to linseed oil, Iberian dragon head oil, Tung oil, Oiticica oil, soybean oil, rapeseed oil, tall oil, sunflower oil and castor oil can be cited. These oils can be used along or as a mixture of them. They are used in the proportions that follow, each according to percentage by weight (% by weight):

| | Range of use | Preferred Uses |
|---|---|---|
| Linseed oil | 1 to 100% by weight | 5 to 85% by weight |
| Iberian dragon head oil | 1 to 100% by weight | 5 to 85% by weight |
| Tung oil | 1 to 100% by weight | 5 to 85% by weight |
| Oiticia oil | 1 to 100% by weight | 5 to 85% by weight |
| Soybean oil | 5 to 60% by weight | 10 to 30% by weight |
| Rapeseed oil | 5 to 60% by weight | 10 to 30% by weight |
| Tall oil | 5 to 60% by weight | 10 to 50% by weight |
| Sunflower seed oil | 5 to 60% by weight | 10 to 30% by weight |
| Castor oil | 5 to 60% by weight | 10 to 30% by weight |

Into the mixture, in addition, resins such as copal resin, balsam resin, hydrocarbon resin, resin esters or hydrated resins, in a proportion up to 30% by weight, may be melted in, if the oil has reached a viscosity between 50 and 100,000 mPas, preferably between 50 and 30,000 MPas, more preferred are between 8,000 and 25,000 mPas.

Here preference is to be given to copal resin, in a proportion between 0.5 and 8% by weight, preferably 1 to 4% by weight, or balsam resin in a proportion between 1 and 22% by weight, preferably between 8 and 15% by weight, hydrocarbon resin in proportion between 0.5 and 10% by weight, preferably between 3 and 7% by weight and tall resin in a proportion between 0.5 and 12% by weight, preferably between 3 and 8.5% by weight.

Other additives can be added to the mixture to accelerate the oxidation and cross-linking, including siccatives, i.e., drying agents, such as cobalt, manganese and lead compounds, and/or combination drying agents, such as iron, cerium, zinc, zirconium, boron and barium compounds, and or adjuvants, such as triallylcyanurate, pentaenrythrite and dipentaenrythrite. These additives further accelerate the oxidation of the oil. For this purpose, the following accelerators are preferred in the usage ranges indicated:

| | Unit | Range of use | Preferred Range of use |
|---|---|---|---|
| Manganese octoate | % by weight | 0.005 to 0.7 | 0.01 to 0.4 |
| Cobalt octoate | % by weight | 0.005 to 0.7 | 0.01 to 0.4 |
| Lead octoate | % by weight | 0.005 to 0.7 | 0.01 to 0.4 |
| $NaBO_2$ | % by weight | 0.0001 to 0.05 | 0.001 to 0.01 |
| Zinc stearate | % by weight | 0.01 to 1.0 | 0.1 to 0.5 |
| Triallyl cyanurate | % by weight | 0.05 to 1.0 | 0.1 to 0.5 |
| Pentaerythrite | % by weight | 0.05 to 2.0 | 0.1 to 1.0 |
| Dipentaerythrite | % by weight | 0.05 to 2.0 | 0.1 to 1.0 |

According to a further embodiment of the present invention, the cross-linking reaction may also be carried out in an emulsion, both an oil-in-water emulsion and a water-in-oil emulsion.

The overall duration of the production process according to the invention is between 2 and 9 hours, preferably between 3 and 6 hours.

In addition, the invention relates to a cross-linked binding agent that can be produced using the process according to the invention. The binding agent according to the invention, despite cross-linking, still exhibits a proportion of unsaturated compounds, for example an iodine number of 20 to 100 correspondingly, and is elastic.

Binding agents of this kind are used, for example, as a linoleum cement in the manufacture of linoleum. The binding agent according to the invention can be compounded and processed by means of the devices that are common in the plastics industry, such as interior kneading devices, extruders, roller devices or calenders. The binding agent advantageously exhibits a melt flow index of 0.02 to 25 ml/24s, preferably between 0.4 and 15 ml/24s, measured at 60° C. for 24 seconds, a complex modulus of transverse elasticity between 1 and 250 kPa, preferably between 10 and 120 kPa and a loss factor between 0.1 and 30, Preferably between 1 and 15,with an oscillating deformation of y=0.09657.

The present invention further relates to the use of the binding agent according to the invention as a plastic replacement product and the use of the binding agent according to the invention as a replacement agent for binding agents for structures with a linoleum surface.

EXAMPLES

The process according to the invention was carried out with the use of a static mixer (SMX type from the Sulzer firm) and the conditions indicated in tables 1 to 3. The speed of rotation through the mixer in all the examples amounted to 28.5 liters per minute, while the foaming-reaction stage was carried out in 350 cycles in all examples. As the gaseous mixture containing oxygen, air was used. In table 1, the sum of the quantities deviates slightly from 100% by weight, because the siccatives are used in small quantities and rounding errors thus result.

The rheological characteristics of the binding agents obtained from examples 1 to 3 were determined by means of rheological measurements on the viscous elastic bodies using E module measurement with a deformation of y=0.09657. The results are shown in table 3.

TABLE 1

|  | Unit | Example 1 | Example 2 | Example 3 |
|---|---|---|---|---|
| Oil |  |  |  |  |
| Linseed oil | % by weight | 70.5 | 82 | 53 |
| Tung oil | % by weight | — | — | 20 |
| Soybean oil | % by weight | — | — | 10 |
| Tall oil | % by weight | 29 | — | — |
| Accelerators |  |  |  |  |
| Manganese octoate | % by weight | — | — | 0.015 |
| Cobalt octoate | % by weight | — | 0.01 | — |
| Zinc stearate | % by weight | — | — | 0.01 |
| Resine |  |  |  |  |
| Balsam resin | % by weight | — | 15 | 12.5 |
| Copal resin | % by weight | — | 3 | 2 |
| Hydrocarbon resin | % by weight | — | — | 2.5 |

TABLE 2

| Pre-tempering oil mixture | Unit | Example 1 | Example 2 | Example 3 |
|---|---|---|---|---|
| Time | [min] | 90 | 40 | 40 |
| Temperature | [° C.] | 140 | 150 | 145 |
| Process parameters |  |  |  |  |
| Preliminary pressure Oil mixture | [kPa] | 420 | 420 | 410 |
| Preliminary pressure - air | [kPa] | 650 | 620 | 600 |
| Temperature - oil circulation | [° C.] | 74 | 78 | 75 |
| Weight - liter of oil foam | [kg/l] | 0.405 | 0.360 | 0.350 |
| Overall air consumption | [kg] | 2.8 | 2.85 | 3.1 |
| Treatment time - foam | [min] | 255 | 165 | 145 |
| Viscosity of the oil when the resin is added | [MPas] | — | 18,000 | 19,500 |
| Duration of the final boiling phase | [min] | 115 | 85 | 70 |
| Temperature of the final boiling phase | [° C.] | 145 | 135 | 135 |
| Overall duration of the manufacturing process for the binding agent | [min] | 460 | 290 | 255 |

TABLE 3

|  | Unit | Example 1 | Example 2 | Example 3 |
|---|---|---|---|---|
| Melt index (60° C./24 sec) | [ml/24 s] | 3.4 | 5.1 | 4.2 |
| Complex modulus of transverse elasticity | [kPa] | 41.5 | 32.1 | 43.5 |
| Loss factor |  | 6.83 | 5.32 | 6.48 |

What is claimed is:

1. A continuous process for producing a cross-linked binding agent comprising:
   foaming with oxygen a mixture containing unsaturated fatty acids and/or fatty acid esters;
   pressurizing the mixture; and,
   reacting the mixture by oxidizing and cross-linking to form the cross-linked binding agent.

2. The process of claim 1, wherein a foam with a weight of 80 to 800 grams per liter is produced during foaming.

3. The process of claim 1, further including continuously tempering the mixture before reacting.

4. The process of claim 1, further including interrupting reacting the mixture using water.

5. The process of claim 1, further including setting mixture pressure at about 0.1 to about 15 MPa and oxygen pressure between about 0.15 and about 5.6 MPa prior to foaming.

6. The process of claim 1, wherein reacting of the mixture is carried out in emulsion.

7. The process of claim 1, further including melting a resin into the mixture during reacting when the mixture has attained a viscosity of between about 50 and about 100,000 mPas.

8. The process of claim 7, wherein the resin is selected from copal resin, balsam resin, hydrocarbon resin, hydrated resin and combinations thereof.

9. The process of claim 1, wherein the mixture includes an oil selected from drying oils, semi-drying oils and combinations thereof.

10. The process of claim 1, further including adding a surface interactive agent to the mixture.

11. The process of claim 1 further including adding to the mixture an agent selected from drying agents, combination drying agents, adjuvants and combinations thereof.

12. The process of claim 1, wherein foaming and reacting the mixture are carried out as a cyclical process.

13. The process of claim 1, further including boiling the mixture after reacting.

14. The process of claim 13, wherein boiling includes continuously compressing the mixture.

15. The process of claim 13, further including adding organic peroxides to the mixture prior to boiling.

16. The process of claim 15, further including:
   heating the mixture; and, compressing the mixture.

17. An elastic binding agent formed according to the process of claim 1.

18. The elastic binding agent of claim 17, wherein the elastic binding agent exhibits an MFI melting index of between about 0.02 and about 25 ml/24s at a temperature of about 60° C.

19. The elastic binding agent of claim 17, wherein the elastic binding agent exhibits a complex modulus of transverse elasticity between about 1 and about 250 kPa.

20. The elastic binding agent of claim 17, wherein the elastic binding agent exhibits a loss factor of between about 0.1 and about 30, at an oscillating deformation of y=0.09657.

21. A plastic replacement product including the elastic binding agent of claim 17.

22. A linoleum surface structure comprising the elastic binding agent claim 17.

23. The continuous process of claim 1, wherein the oxygen is contained within a gaseous mixture.

24. The process of claim 16, wherein the organic peroxides are stabilized during heating.

25. The process of claim 1, wherein partial cross-linking occurs during heating.

26. The process of claim 1, wherein peroxide-initiated cross-linking occurs during compressing.

* * * * *